US010180956B2

(12) United States Patent
Allwardt et al.

(10) Patent No.: US 10,180,956 B2
(45) Date of Patent: Jan. 15, 2019

(54) CONFIGURABLE COMMIT IN A CONTENT MANAGEMENT SYSTEM

(71) Applicant: Veeva Systems Inc., Pleasanton, CA (US)

(72) Inventors: Derek Allwardt, Pleasanton, CA (US); Xing Chen, San Ramon, CA (US); Gary Lee, San Ramon, CA (US)

(73) Assignee: Veeva Systems Inc., Pleasanton, CA (US)

(*) Notice: Subject to any disclaimer, the term of this patent is extended or adjusted under 35 U.S.C. 154(b) by 291 days.

(21) Appl. No.: 15/205,586

(22) Filed: Jul. 8, 2016

(65) Prior Publication Data

US 2018/0011896 A1 Jan. 11, 2018

(51) Int. Cl.
*G06F 17/30* (2006.01)

(52) U.S. Cl.
CPC .. *G06F 17/30377* (2013.01); *G06F 17/30371* (2013.01); *G06F 17/30864* (2013.01)

(58) Field of Classification Search
CPC ......... G06F 17/30377; G06F 17/30864; G06F 17/30371; G06F 17/30
See application file for complete search history.

(56) References Cited

U.S. PATENT DOCUMENTS

| | | | | |
|---|---|---|---|---|
| 2005/0289414 A1* | 12/2005 | Adya | ................... | G06F 11/1441 714/724 |
| 2010/0122175 A1* | 5/2010 | Gupta | ................. | H04L 41/0893 715/735 |
| 2012/0109913 A1* | 5/2012 | Rajure | ................... | H04L 45/021 707/694 |
| 2014/0304765 A1* | 10/2014 | Nakamoto | ............. | H04L 63/20 726/1 |
| 2015/0249682 A1* | 9/2015 | Zhang | .................... | H04L 63/20 726/1 |
| 2016/0182328 A1* | 6/2016 | Bhasin | .................. | H04L 43/067 709/224 |
| 2016/0259697 A1* | 9/2016 | Takada | ................... | G06F 9/4401 707/E17.005 |

* cited by examiner

*Primary Examiner* — Anh Ly (57) ABSTRACT

Systems and methods for controlling commits to a search platform in a content management system. Identification information of endpoints may be passed down from endpoints to the search platform. Endpoints may be grouped based on their identification information, and commit policies may be assigned to each group of endpoints. A commit request from an endpoint to the search platform may be intercepted, its group may be determined based on the endpoint identification information, and commit policy for that group may be applied to the commit request.

20 Claims, 6 Drawing Sheets

CONFIGURABLE COMMIT IN A CONTENT MANAGEMENT SYSTEM

BACKGROUND

The subject technology relates generally to content management, and more particularly to commit configuration in enterprise content management.

Users increasingly depend on content management systems because of their ubiquitous and managed access, from anywhere, at any time, from any device. However, because of the large volume of documents in content management systems, large number of users, and large number of commit requests, managing data commits has been a massive and very time consuming operation.

SUMMARY

The disclosed subject matter relates to a method for controlling commits to a search platform from a server in a content management system. The method comprises: receiving identification information for a plurality of endpoints, wherein an endpoint is the start of a path of execution in the server, and wherein each of the plurality of endpoints has its unique identification information. The method further comprises: assigning the plurality of endpoints to a first logical group and a second logical group based on their identification information; and defining a first commit policy and a second commit policy in the content management system, wherein the first commit policy delays commits for a first period of time, and the second commit policy delays commits for a second period of time. The method further comprises: mapping the first commit policy to the first logical group of endpoints based on commit requirements for endpoints in the first logical group, and the second commit policy to the second logical group of endpoints based on commit requirements for endpoints in the second logical group; and storing the first and second commit policies together with groups of endpoints mapped to them in a policy directory in the content management system.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
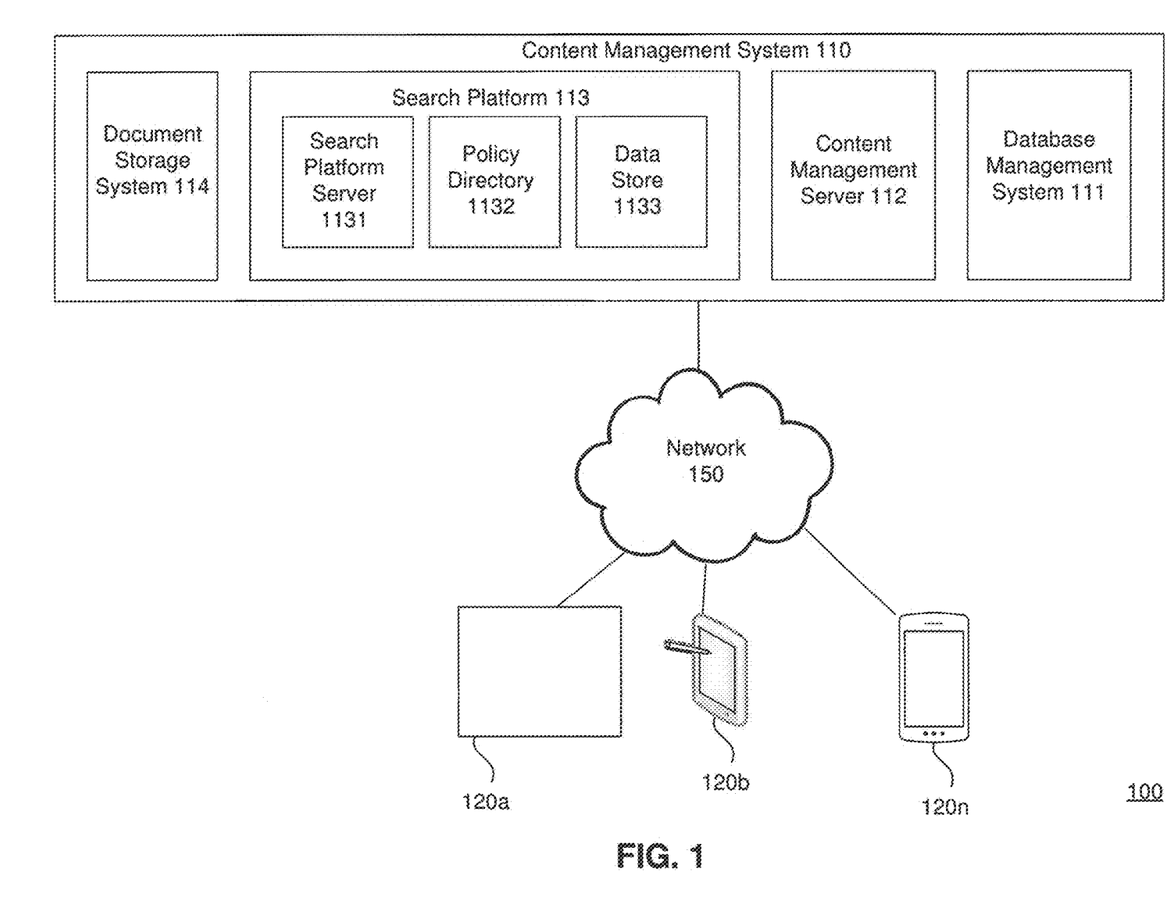
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, . . . 120n, coupled to each other via a network 150. The content management system 110 may store content that user computing devices 120a-120n may access and allow users to interact with its content in a specific business context. The content management system 110 may include a database management system 111, a content management server 112, a search platform 113 and a document storage system 114. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content management server 112 is typically a remote computer system accessible over a remote or local network, such as the network 150. Various code in the content management server 112 may commit data (e.g., customer data) to the search platform 113 to make the data visible to users of the content management system 110. The code in the content management server 112 may include the endpoints to be discussed below with reference to FIG. 4. A policy directory 1121 may be stored in the content management server 112 as well.

The database management system 111 may be a relational database management system, and may store metadata of documents in the document storage system 114. Data may be taken out of the database management system 111, processed and sent to a denormalized dataset store (e.g., the search platform 113) to make it easier to search and retrieve. Consequently, the content management server 112 may interact with the persistent data, which is a combination of data in the database management system 111 and that in the search platform 113. In one implementation, the database management system 111 may be a MySQL system.

In one implementation, the search platform 113 may include a search platform server 1131 and a data store 1132 for storing document data, workflow data, index files, and user information. In one implementation, the search platform server 1131 may be SOLR server.

In one implementation, the content management system 110 may be a multi-tenant system where various elements of hardware and software may be shared by one or more customers. For instance, a server may simultaneously process requests from a plurality of customers, and the content management system 110 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
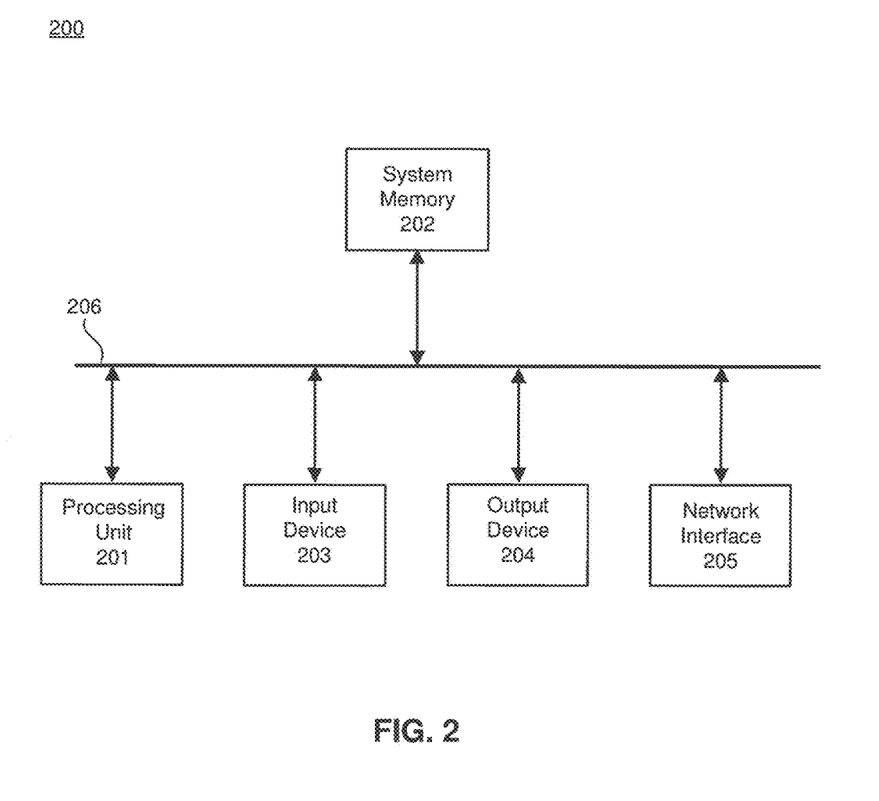
FIG. 2 illustrates an example high level block diagram of a computing device.

FIG. 2 illustrates an example block diagram of a computing device 200 which can be used as the user computing devices 120a-120n, the content management server 112 or the search platform server 1131 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
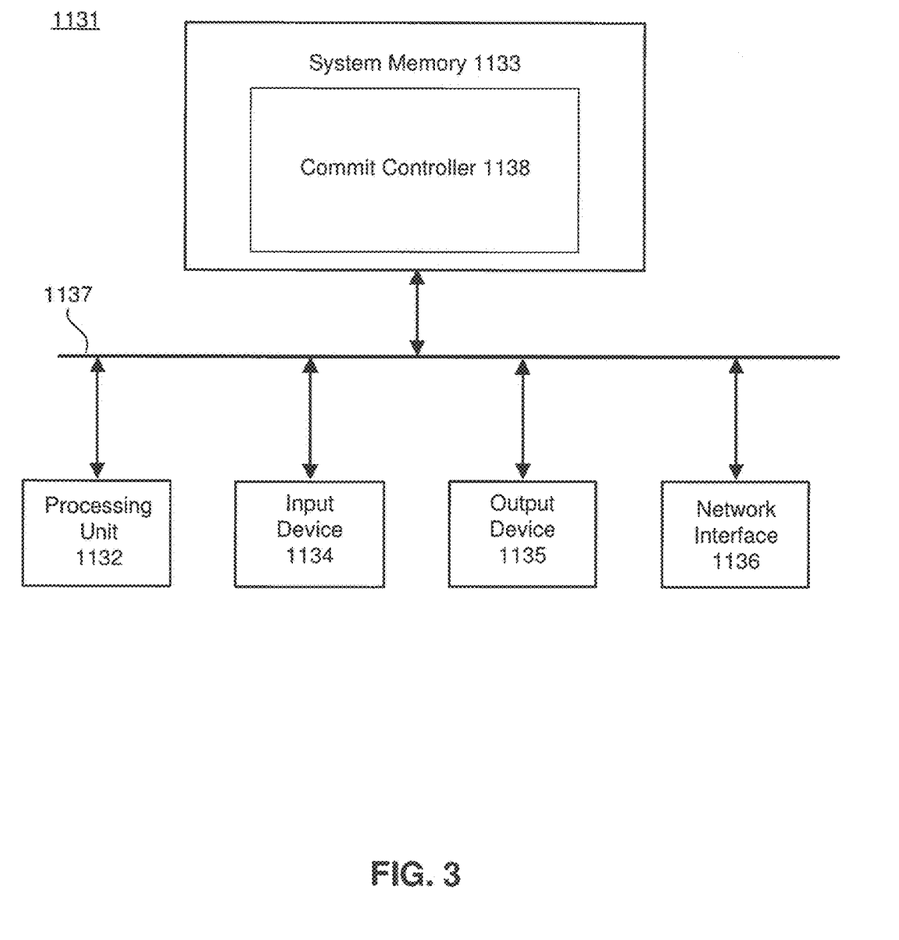
FIG. 3 illustrates an example high level block diagram of the search platform server according to one embodiment of the present invention.

FIG. 3 illustrates an example high level block diagram of the search platform server 1131 according to one embodiment of the present invention. The search platform server 1131 may be implemented by the computing device 200, and may have a processing unit 1132, a system memory 1133, an input device 1134, an output device 1135, and a network interface 1136, coupled to each other via a system bus 1137. The system memory 1133 may store a commit controller 1138, which may control the process shown in FIG. 5 and FIG. 6.

Commit strategy may refer to the way to commit data or changes from code in the content management server 112 to the search platform 113 permanently. A code path in the content management server 112 may choose to issue a commit request and then wait for commit right away, so that the content may show up immediately in the search platform 113 and be visible to users of the content management system 110. But every commit may come with a cost. The more the commits processed, the slower the search performance in the search platform 113.

Since some use cases (e.g., Adddoc) do not need data changes to be visible immediately, the commit framework of the present invention may identify these use cases and delay commits from these use cases to improve performance of the search platform 113. A commit configuration may be associated with endpoints. An endpoint is the start of a path of execution in the content management server 112, or the beginning of a particular function call from the content management server 112, like a search, or an upload. A commit policy may be defined for the commit configuration, use case by use case. Endpoints that do not need to commit data immediately may be identified, and execution of their commit requests may be delayed for a certain period of time based on the commit policy. Identification of the endpoints may be fine-grained, or coarse-grained, for the purpose of defining the commit policies. The commit framework may be plugged in and change the commit behavior without having to change a lot of code in the content management server 112.

Figure 4:
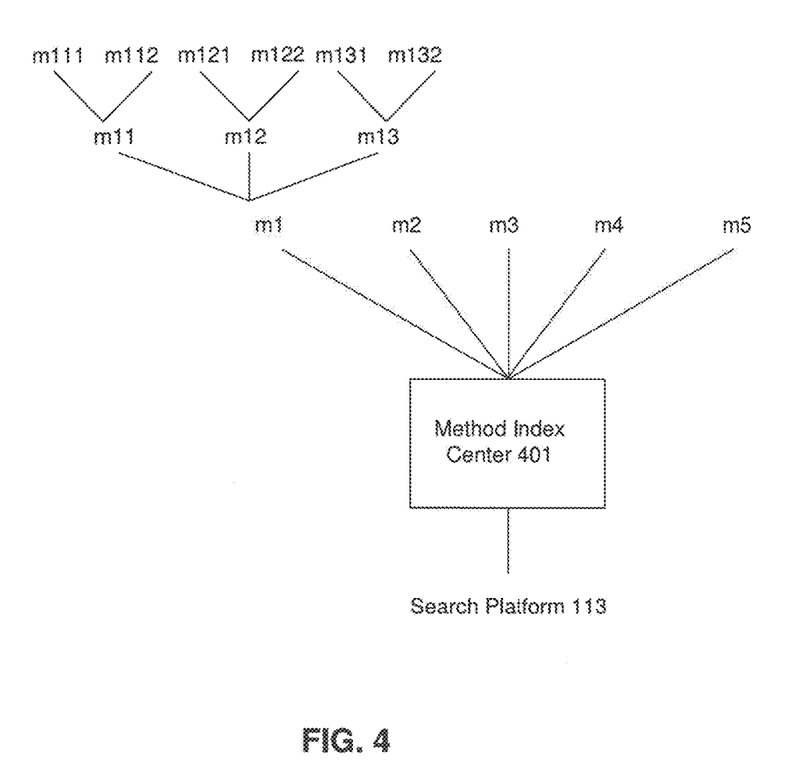
FIG. 4 illustrates examples of calls from a content management server to a search platform according to one embodiment of the present invention.

FIG. 4 illustrates examples of function calls from the content management server 112 to the search platform 113 according to one embodiment of the present invention. As shown, methods m1, m2, m3, m4 and m5 may call the search platform 113 via the policy directory 1121 for different tasks. Some of the methods may be utility methods for holding out workflow with library or reporting. On top of a method (e.g., m1), other methods (e.g., m11, m12, m13, m111, m112, m121, m122, m131 and m132) may keep branching off. The highest level are the endpoints (e.g., m111, m112, m121, m122, m131 and m132), which may eventually call the method m1. The endpoints may be, e.g., an Adddoc, Workflow or Report operation. Thus, the low level method (e.g., m1) may support many different use cases, all of which may have different requirements with regard to how quickly the data need to be stored in the search platform 113.

Instructions may be sent to the search platform 113 from one of the lower level methods (e.g., m1, m2, m3, m4 or m5), which may be implemented with utilities like a SOLR client. The lower level utilities may allow calls to the search platform 113 in many different ways. Higher level methods (e.g., m11, m12, m13, m111, m112, m121, m122, m131 and m132), built on top of the lower level methods, may be, e.g., Adddoc, Update Security, or Add Flow Task, and may end up calling one of the lower level methods (e.g., m1). The number of calls to the search platform 113 may increase with the number of methods, and the response of the search platform 113 may become slow if it has to process all commit requests immediately.

The commit framework of the present invention may identify the endpoints at the highest level (e.g., m111, m112, m121, m122, m131 and m132), and pass that identification information down to the lowest level (e.g., m1). The commit policy for each endpoint may be searched in the policy directory 1121, and the matching commit policy may be applied, e.g., the Adddoc may be delayed by 2 seconds, the Workflow may be delayed by 10 seconds, and the Report may be delayed by 30 seconds.

Figure 5:
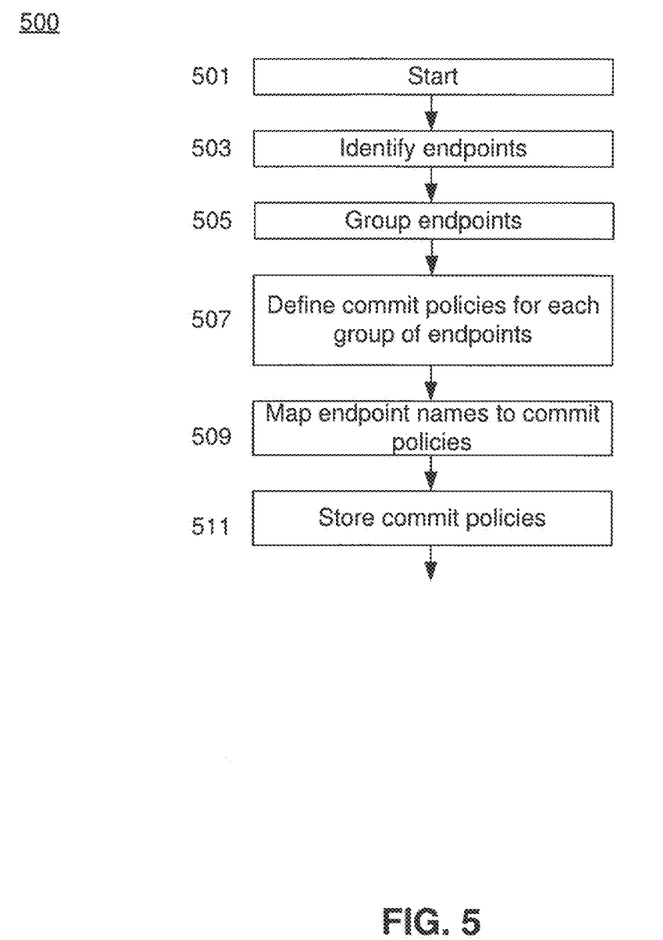
FIG. 5 illustrates an example flowchart of a method for configuring a commit framework in a content management system according to one embodiment of the present invention.

FIG. 5 illustrates an example flowchart of a method for configuring a commit framework in a content management system according to one embodiment of the present invention. In one implementation, ThreadLocal, a mechanism in Java that allows adding data to a thread, may be used to pass endpoint identification information down from endpoints directly to the search platform 113 without changing the methods therebetween and the code. The endpoint identification information may be put on ThreadLocal, passed down from endpoints at the highest level to those at the lowest level, and read out by the commit controller 1138 to delay commit. The ThreadLocal data may be created at a number of places.

The process may start at 501.

At 503, identification information may be received for each endpoint. An endpoint is the beginning of life for a thread. In one implementation, the endpoint identification information may include ThreadLocal data. The endpoint identification information may include a package name or method name, and may be used to map the policies. In one example, fully qualified Java package names, class names and/or method names which are unique to the system may be included in the endpoint identification information. In one example, the endpoint identification information may include fully qualified references and patterns may be applied, e.g.,     abcde.ecm.docs.interfaces.web.queue.DocumentCreate Processor#processMessage,    (1)

abcde.ecm.docs.application.binderexport.impl.Binder ExportJobProcessor#execute, or    (2)

abcde.ecm.docs.interfaces.web.DocumentController#modify DocumentAttrs.    (3)

As shown, example (1) includes Java package name "abcde.ecm.docs.interfaces.web.queue", class name "DocumentCreateProcessor", and method name "processMessage". Example (2) includes Java package name "abcde.ecm.docs.application.binderexport.impl", class name "BinderExportJobProcessor", and method name "execute". Example (3) includes Java package name "abcde.ecm.docs.interfaces.web", class name "DocumentController", and method name "modifyDocumentAttrs".

The endpoint identification information above includes Java package name, class name and method name. Such a pattern may help to group together many endpoints into a single logical group, as will discuss below.

ThreadLocal from endpoints may include, e.g., request threads, durable queues, jobs, and other instances of new Runnable( ) and Thread( ).

At 505, endpoints may be grouped based on their identification information. The grouping may be based on the endpoints' identification information, so that endpoints with similar commit requirements can be put into a same logical group. The logical group for queues may be, e.g.,     abced.ecm.docs.intertfaces.web.queue.

The logical group for Binder Export may be, e.g., abcde.ecm.docs.application.binderexport.

A particular package name may be referenced, so that endpoints underneath that package may be defined as a group and a single policy may be applied to it.

At 507, commit policies may be defined, e.g., Auto-commit, or Commit-within-15-seconds. The commit policy may be directives or instructions to the search platform 113 about how soon the commit needs to be done to make the data to be visible.

At 509, endpoint groups may be mapped to the commit policies. In one implementation, the endpoint group for queues may be mapped to the commit policy Auto-commit, and the endpoint group for Binder Export may be mapped to the commit policy Commit-within-15-seconds.

In one implementation, the endpoints which are too aggressive with commits may be determined by looking at the logs and running report. Such information may be used to prioritize further configuration changes to focus on endpoints which are the most offensive with the commits.

In one implementation, the search platform 113 usage patterns may be investigated to look for code which requires immediate visibility, and solutions may be designed for each use case to work without immediate visibility.

At 511, endpoint groups and their mapped commit policies may be stored in the policy directory 1121, and changes to the commit policies may be committed to the configuration framework at runtime.

Figure 6:
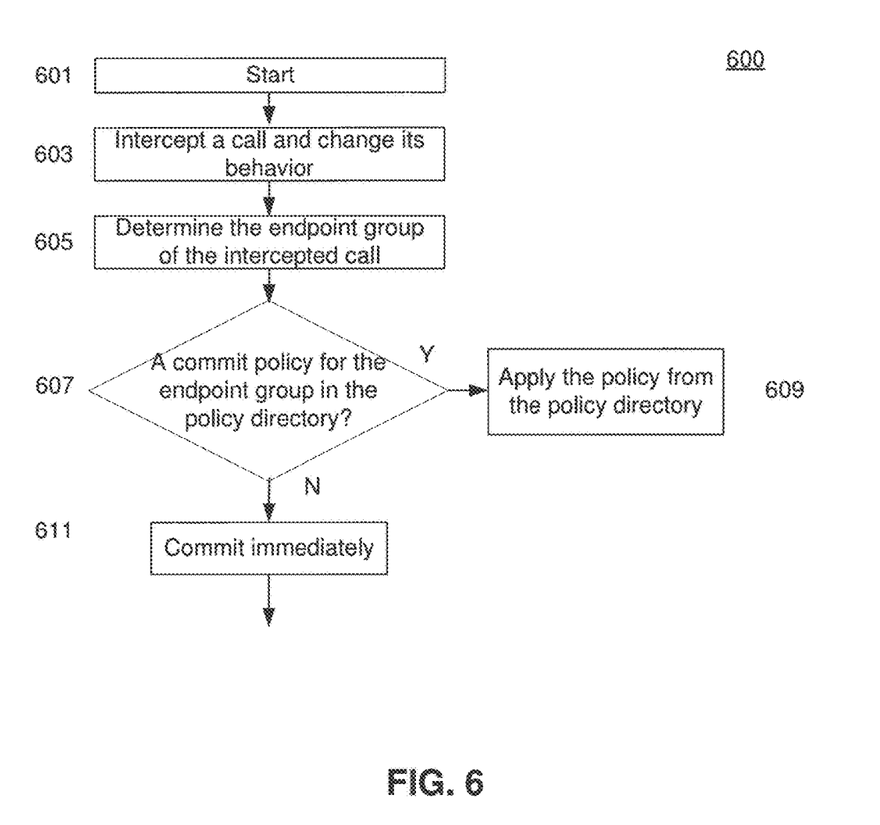
FIG. 6 illustrates an example flowchart of a method for processing a commit request in a content management system according to one embodiment of the present invention.

FIG. 6 illustrates an example flowchart of a method for processing a commit request in a content management system according to one embodiment of the present invention. At run time, commit requests may come through the framework, the endpoint identification information may be obtained for each commit request, and the commit policy for each endpoint may be looked up in the commit policy directory 1121. If there is a matching commit policy, that commit policy should be followed. Otherwise, nothing changes and the commit request is processed without delay.

The process may start at 601.

At 603, the commit controller 1138 may intercept a call and hold off commit, even when the code in the content management server 112 indicates that a commit needs to be done right away, it will wait until the commit is done, and it needs to be notified when the commit is done. In one implementation, the commit controller 1138 may intercept the call at a lower level (e.g., m1), ignore its instructions to be committed immediately, and change its behaviors to hold off commit, instead of changing all the code calling.

At 605, the endpoint group of the intercepted call may be determined based on identification information of the endpoint.

At 607, it may be determined if there is a commit policy for the endpoint group in the policy directory 1121. In one implementation, part of the fully qualified name (e.g., (1), (2) and (3)) may be replaced with a wild card * to search for the commit policy for the endpoint group.

If yes, at 609, the commit policy from the policy directory 1121 may be applied to introduce the delayed commit based on the commit policy. In one implementation, durable queue processors may be used to configure and apply delays. Data may be put in a durable queue and be pulled up later for processing, so the data in the queue have already been delayed to a certain extent. Further delay may be made to apply the commit policy. In one example, all commits may be delayed for the same period of time, e.g., 30 seconds. In one example, different delays may be applied to different endpoint groups based on the commit policies in the policy directory 1121.

Otherwise, at 611, the customer data may be committed immediately.

Since the endpoints are grouped based on their commit delay information, and different policies may be applied to different groups to govern commit behavior, delays may be configured for the endpoints to improve performance of the content management system.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives. RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server". "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for controlling commits to a search platform from a server in a content management system, comprising:

receiving identification information for a plurality of endpoints, wherein an endpoint is the start of a path of execution in the server, and wherein each of the plurality of endpoints has its unique identification information;

assigning the plurality of endpoints to a first logical group for controlling commits to the search platform from the server in the content management system and a second logical group for controlling commits to the search platform from the server in the content management system based on their identification information;

defining a first commit policy for controlling commits to the search platform from the server in the content management system and a second commit policy for controlling commits to the search platform from the server in the content management system, wherein the first commit policy delays commits from the server for a first period of time, and the second commit policy delays commits from the server for a second period of time;

mapping the first commit policy for controlling commits to the search platform from the server in the content management system to the first logical group of endpoints based on commit requirements for endpoints in the first logical group, and the second commit policy for controlling commits to the search platform from the server in the content management system to the second logical group of endpoints based on commit requirements for endpoints in the second logical group; and storing the first and second commit policies for controlling commits to the search platform from the server in the content management system together with logical groups of endpoints mapped to them in a policy directory in the content management system.

2. The method of claim 1, wherein the endpoint identification information comprises a package name, a class name or a method name.

3. The method of claim 1, wherein the endpoint identification information has a predetermined pattern.

4. The method of claim 1, wherein the endpoint identification information comprises ThreadLocal data for passing identification information of an endpoint from the endpoint to the policy directory.

5. The method of claim 4, wherein the ThreadLocal data comprise a request thread, a durable queue, or a job.

6. The method of claim 1, further comprising: determining endpoints which are aggressive with commits.

7. The method of claim 1, further comprising: determining endpoints which do not require data changes to be immediately visible in the search platform.

8. The method of claim 1, further comprising: intercepting a first commit request to the search platform, ignoring an instruction to commit immediately, and holding off the commit.

9. The method of claim 8, further comprising: determining that the first commit request is from an endpoint in the first logical group.

10. The method of claim 9, further comprising: searching the policy directory and determining that the first commit policy matches the first logical group.

11. The method of claim 10, further comprising: using a wild card to replace part of the identification information to search the policy directory.

12. The method of claim 10, further comprising: applying the first commit policy to the first commit request to delay the commit for the first period of time.

13. The method of claim 11, wherein a durable queue processor is used to delay the commit for the first period of time.

14. The method of claim 8, further comprising: determining that there is no matching commit policy in the policy directory for the first commit request, and following the instruction to commit immediately.

15. A content management system, comprising:
a document storage system;
a database management system for storing metadata of documents in the document storage system;
a search platform; and
a content management server which comprises:
a plurality of endpoints, wherein an endpoint is the start of a path of execution in the content management server;
a policy directory; and
a commit controller for
receiving identification information of the plurality of endpoints;
assigning the plurality of endpoints to a first logical group and a second logical group based on their identification information;
receiving a first commit policy for controlling commits to the search platform from the server in the content management system and a second commit policy for controlling commits to the search platform from the server in the content management system, wherein the first commit policy delays commits from the server for a first period of time, and the second commit policy delays commits from the server for a second period of time;
mapping the first commit policy for controlling commits to the search platform from the server in the content management system to the first logical group of endpoints based on commit requirements for endpoints in the first logical group, and the second commit policy for controlling commits to the search platform from the server in the content management system to the second logical group of endpoints based on commit requirements for endpoints in the second logical group; and
storing the first and second commit policies for controlling commits to the search platform from the server in the content management system together with logical groups of endpoints mapped to them in the policy directory.

16. The system of claim 15, wherein the endpoint identification information comprises a package name, a class name or a method name.

17. The system of claim 15, wherein the commit controller further: intercepts a first commit request to the search platform, ignores an instruction to commit immediately, and holds off the commit.

18. The system of claim 17, wherein the commit controller further: determines that the first commit request is from an endpoint in the first logical group.

19. The system of claim 18, wherein the commit controller further: searches the policy directory and determines that the first commit policy matches the first logical group.

20. The system of claim 19, wherein the commit controller further: applies the first commit policy to the first commit request to delay the commit for the first period of time.

* * * * *